United States Patent
Sima et al.

(10) Patent No.: US 11,928,767 B2
(45) Date of Patent: Mar. 12, 2024

(54) METHOD FOR AUDIO-DRIVEN CHARACTER LIP SYNC, MODEL FOR AUDIO-DRIVEN CHARACTER LIP SYNC AND TRAINING METHOD THEREFOR

(71) Applicant: NANJING SILICON INTELLIGENCE TECHNOLOGY CO., LTD., Jiangsu (CN)

(72) Inventors: Huapeng Sima, Jiangsu (CN); Zheng Liao, Jiangsu (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/212,545

(22) Filed: Jun. 21, 2023

(65) Prior Publication Data

US 2024/0054711 A1 Feb. 15, 2024

(30) Foreign Application Priority Data

Aug. 10, 2022 (CN) .......................... 202210953133.5

(51) Int. Cl.
*G06T 13/40* (2011.01)
*G06T 13/20* (2011.01)
(Continued)

(52) U.S. Cl.
CPC ............ *G06T 13/40* (2013.01); *G06T 13/205* (2013.01); *G06T 13/80* (2013.01); *G06V 10/774* (2022.01);
(Continued)

(58) Field of Classification Search
None
See application file for complete search history.

(56) References Cited

U.S. PATENT DOCUMENTS

| 2019/0095775 A1* | 3/2019 | Lembersky | G06N 3/006 |
| 2021/0082453 A1* | 3/2021 | Guo | G06F 18/24 |
| 2021/0390945 A1* | 12/2021 | Zhang | G10L 13/08 |

FOREIGN PATENT DOCUMENTS

| CN | 113948105 A | 1/2022 |
| CN | 114419702 A | 4/2022 |

(Continued)

*Primary Examiner* — Peter Hoang
(74) *Attorney, Agent, or Firm* — Bret E. Field; Bozicevic, Field & Francis LLP

(57) ABSTRACT

Embodiments of the present disclosure provide a method for audio-driven character lip sync, a model for audio-driven character lip sync, and a training method therefor. A target dynamic image is obtained by acquiring a character image of a target character and speech for generating a target dynamic image, processing the character image and the speech as image-audio data that may be trained, respectively, and mixing the image-audio data with auxiliary data for training. When a large amount of sample data needs to be obtained for training in different scenarios, a video when another character speaks is used as an auxiliary video for processing, so as to obtain the auxiliary data. The auxiliary data, which replaces non-general sample data, and other data are input into a model in a preset ratio for training. The auxiliary data may improve a process of training a synthetic lip sync action of the model, so that there are no parts unrelated to the synthetic lip sync action during the training process. In this way, a problem that a large amount of sample data is required during the training process is resolved.

9 Claims, 4 Drawing Sheets

(51) Int. Cl.
*G06T 13/80* (2011.01)
*G06V 10/774* (2022.01)
*G06V 10/82* (2022.01)
*G06V 10/98* (2022.01)
*G06V 40/20* (2022.01)
*G10L 21/06* (2013.01)

(52) U.S. Cl.
CPC .............. *G06V 10/82* (2022.01); *G06V 10/98* (2022.01); *G06V 40/20* (2022.01); *G10L 21/06* (2013.01)

(56) References Cited

FOREIGN PATENT DOCUMENTS

| | | |
|---|---|---|
| CN | 114529785 A | 5/2022 |
| CN | 114581980 A | 6/2022 |

\* cited by examiner

METHOD FOR AUDIO-DRIVEN CHARACTER LIP SYNC, MODEL FOR AUDIO-DRIVEN CHARACTER LIP SYNC AND TRAINING METHOD THEREFOR

CROSS-REFERENCE TO RELATED APPLICATIONS

This application claims priority to Chinese Patent Application No. 202210953133.5, entitled "METHOD FOR AUDIO-DRIVEN CHARACTER LIP SYNC, MODEL FOR AUDIO-DRIVEN CHARACTER LIP SYNC AND TRAINING METHOD THEREFOR", filed with the China National Intellectual Property Administration (CNIPA) on Aug. 10, 2022, the entire disclosure of which is incorporated by reference in its entirety herein.

FIELD OF THE INVENTION

The present disclosure relates to the field of natural human-machine interactions, and in particular, to a method for audio-driven character lip sync, a model for audio-driven character lip sync, and a training method therefor.

BACKGROUND OF THE INVENTION

Research on audio-driven lip sync technology is an important content in the field of natural human-machine interactions. The audio-driven lip sync technology is to process speech of a character, so that lip sync actions corresponding to the speech may be synthesized on a dynamic avatar of the character; and to drive the corresponding character to do lip sync actions based on audio, so as to synthesize a lip sync action video corresponding to the audio.

Implementation of the audio-driven lip sync technology relies on a pre-trained neural network model. The neural network model uses the lip sync action video as general sample data. During a training process, a relationship between lip sync change and the audio is learned from the lip sync action video, so that the audio-driven lip sync may be implemented by the model. However, in a process of applying the neural network model, in order to achieve a good effect of the audio-driven lip sync under an actual use scenario of a user, there is a need that a targeted training is performed according to the actual use scenario of the user.

In a process of performing the targeted training according to the actual use scenario of the user, the model needs to be trained by sample data in advance. However, the sample data includes sample data related to a synthetic action and data unrelated to a synthetic lip sync action. As a result, a large amount of sample data is required for training the model, and thus a training part of the model that is unrelated to the synthetic lip sync action may be improved. An excessively large amount of sample data is required to complete the training process.

SUMMARY OF THE INVENTION

To resolve a problem that an excessively large amount of sample data is required by a model to complete a training process because training data includes sample data related to a synthetic action and data unrelated to a synthetic lip sync action, according to a first aspect, the present disclosure provides a model for audio-driven character lip sync. The model includes a feature extraction module, an encoder module, a synthesis module, a data processing module, and a decoder module, where the feature extraction module is configured to extract an audio feature of target speech and an image feature of a target image, where the target speech indicates speech for a target dynamic image generated for a target character, the target image indicates a lip sync image for the target dynamic image generated for the target character, and the target dynamic image indicates a video image when the target image performs lip sync actions corresponding to the target speech;

the encoder module is configured to encode the audio feature and the image feature to obtain audio encoded data and image encoded data, respectively;

the synthesis module is configured to stitch the audio encoded data and the image encoded data to obtain image-audio data;

the data processing module is configured to perform synthesis processing on the image-audio data to obtain a dynamic image encoding result; and the decoder module is configured to decode the dynamic image encoding result to obtain the target dynamic image.

In an embodiment of the present disclosure, the model further includes a preprocessing module configured to generate, during a training process of the model, a silent video with preset duration based on a sample image, process the silent video as sample image data, and process an auxiliary video as auxiliary data, wherein the sample image indicates a lip sync image of the target character; the auxiliary video includes a non-target lip sync action generated through speaking by a non-target character and non-target speech corresponding to the non-target lip sync action; and the sample image data and the auxiliary data are used for training of the model.

In an embodiment of the present disclosure, the encoder module includes an input layer, a convolution layer, and an output layer;

the input layer is configured to input the audio feature as an input sequence;

the convolution layer is configured to perform convolutional processing on the input sequence; and the output layer is configured to output the sequence after the convolutional processing as an output sequence.

In an embodiment of the present disclosure, the data processing module includes several residual blocks and a distraction block;

the residual block is configured to perform deep learning on a feature of the image-audio data; and the distraction block is configured to segment a deep-learning feature of the residual block.

According to a second aspect, the present disclosure provides a training method for a model for audio-driven character lip sync. The method includes:

acquiring sample data including a sample image and auxiliary data, wherein the sample image indicates a lip sync image for a target character, the auxiliary data is obtained by pre-processing an auxiliary video, and the auxiliary video includes a non-target lip sync action generated through speaking by a non-target character and non-target speech corresponding to the non-target lip sync action;

generating a silent video with a preset duration based on the sample image, and processing the silent video as sample image data, where audio in the silent video is blank audio;

inputting the sample image data and the auxiliary data in the sample data into a to-be-trained model according to a preset ratio, to obtain an image encoding result, and training the to-be-trained model based on the image encoding result and a label of the sample data, to obtain a training result, where the to-be-trained model is the model for audio-driven character lip sync according to any item in the first aspect, and the label of the sample data includes the blank audio corresponding to the sample image data in the silent video, and the non-target speech corresponding to the non-target lip sync action in the auxiliary video; and obtaining a trained model when the training result meets a preset result, where the preset result indicates that a loss function of the to-be-trained model is trained to converge.

In an embodiment of the present disclosure, the method includes: when the training result does not meet the preset result, readjusting distribution of the sample image data and the auxiliary data in the sample data according to the preset ratio, and inputting the adjusted sample data into the to-be-trained model again for training; and obtaining the trained model when the training result meets the preset result.

In an embodiment of the present disclosure, the step of the readjusting distribution of the sample image data and the auxiliary data in the sample data according to the preset ratio includes:

resetting a first preset amount of sample image data and a second preset amount of auxiliary data in the sample data, or increasing or reducing both a third preset amount of sample image data and a fourth preset amount of auxiliary data based on the preset ratio.

In an embodiment of the present disclosure, the step of the obtaining the trained model when the training result meets the preset result includes:

calculating a training error of the training result; and
comparing the training error with an image error of a standard dynamic image to obtain a comparison result, the image error being an error between two consecutive frames in the standard dynamic image,
wherein when the comparison result is that the training error is less than or equal to the image error, the training result meets the preset result.

According to a third aspect, the present disclosure provides a method for audio-driven character lip sync, applicable to a model for audio-driven character lip sync that is obtained by any training method according to the second aspect, and including:

acquiring target speech and a target image for driving a target lip sync action, where the target speech indicates speech for a target dynamic image generated for a target character, the target image indicates a lip sync image for the target dynamic image generated for the target character, and the target dynamic image indicates a video image when the target image performs lip sync actions corresponding to the target speech;
extracting an audio feature of the target speech and an image feature of the target image;
encoding the audio feature and the image feature to obtain audio encoded data and image encoded data, respectively;
stitching the audio encoded data and the image encoded data to obtain image-audio data;
performing synthesis processing on the image-audio data to obtain a dynamic image encoding result; and
decoding the dynamic image encoding result to obtain the target dynamic image.

In an embodiment of the present disclosure, the process of encoding the audio feature to obtain the audio encoded data includes:

performing causal convolution calculation on the audio feature to obtain causal convolution data;
performing dilated convolution calculation on the causal convolution data to obtain dilated convolution data;
calculating a residual error generated during the convolution calculation; and
obtaining the audio coded data based on the dilated convolution data and the residual error.

It may be learned from the foregoing technical solutions that, the method for audio-driven character lip sync, the model for audio-driven character lip sync, and the training method therefor that are provided in the present disclosure have the following technical effects. The target dynamic image is obtained by acquiring the character image of the target character and the speech for generating the target dynamic image, respectively processing the character image and the speech as image-audio data that may be trained, and mixing the image-audio data with the auxiliary data for training. When a large amount of sample data needs to be obtained for training in different scenarios, a video when another character speaks is used as the auxiliary video for processing, so as to obtain the auxiliary data. The auxiliary data, which replaces non-general sample data, is mixed with other data in the preset ratio, and the mixed sample data is input into the model for training. When there is a lack of training data for an actual use scenario, by means of replacing the training data with the auxiliary data, lip sync is driven by audio, thereby reducing an amount magnitude of sample data required in the training process.

BRIEF DESCRIPTION OF THE DRAWINGS

To more clearly describe the technical solutions of the present disclosure, the accompanying drawings to be used in the embodiments are briefly described below. Obviously, persons of ordinary skills in the art may also derive other accompanying drawings according to these accompanying drawings without an effective effort.

DETAILED DESCRIPTION OF THE EMBODIMENTS

The present disclosure is described below in detail with reference to the accompanying drawings and in conjunction with the embodiments. It should be noted that the embodiments in the present disclosure and the features in the embodiments may be combined with one another in the case of no conflict.

It should be noted that terms "first", "second", and the like in the specification of the present disclosure are intended to distinguish between similar objects, but are not necessarily intended to describe a particular sequence or a sequential order.

The terms "a plurality of embodiments", "some embodiments", "one embodiment", or "embodiment" mentioned throughout this specification mean that a component or a feature described in conjunction with the embodiments is included in at least one embodiment. Therefore, the phrases such as "in a plurality of embodiments", "in some embodiments", "in at least one another embodiment", or "in an embodiment" that appear throughout this specification may not necessarily refer to same embodiments. In addition, in one or more embodiments, specific features, components, or features may be combined in any suitable manner. Therefore, without limitation, specific features, components, or features illustrated or described in combination with one embodiment may be entirely or partially combined with features, components, or features of one or more other embodiments. Such modification and variation are intended to fall within the scope of the present disclosure.

During a training process, a neural network model uses a lip sync action video as general sample data. A relationship between lip sync change and audio is learned from the lip sync action video, so that the audio-driven lip sync may be implemented by the model. However, in a process of applying the neural network model, in order to achieve a good effect of the audio-driven lip sync under an actual use scenario of a user, there is a need that a targeted training is performed according to the actual use scenario of the user. However, in a process of performing the targeted training according to the actual use scenario of the user, the model needs to be trained by sample data in advance. However, the sample data includes sample data related to a synthetic action and data unrelated to a synthetic lip sync action. As a result, a large amount of sample data is required for training the model, and it is much difficult to acquire the sample data.

Figure 1:
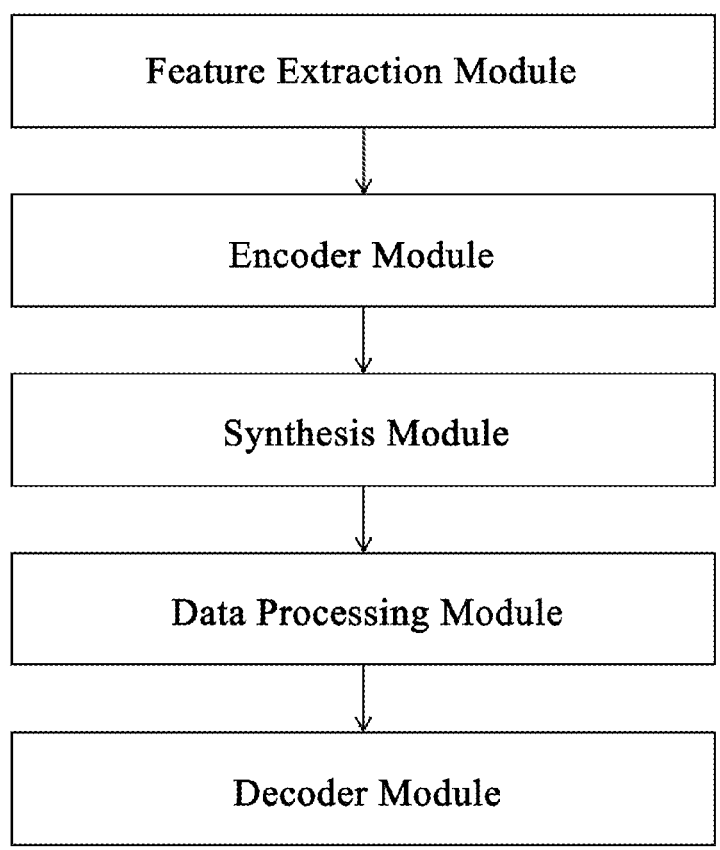
FIG. 1 is a schematic diagram of a structure of a model for audio-driven character lip sync according to the present disclosure.

To resolve the foregoing problem, according to a first aspect, the present disclosure discloses a model for audio-driven character lip sync. Referring to FIG. 1, the model includes a feature extraction module, an encoder module, a synthesis module, a data processing module, and a decoder module.

Figure 2:
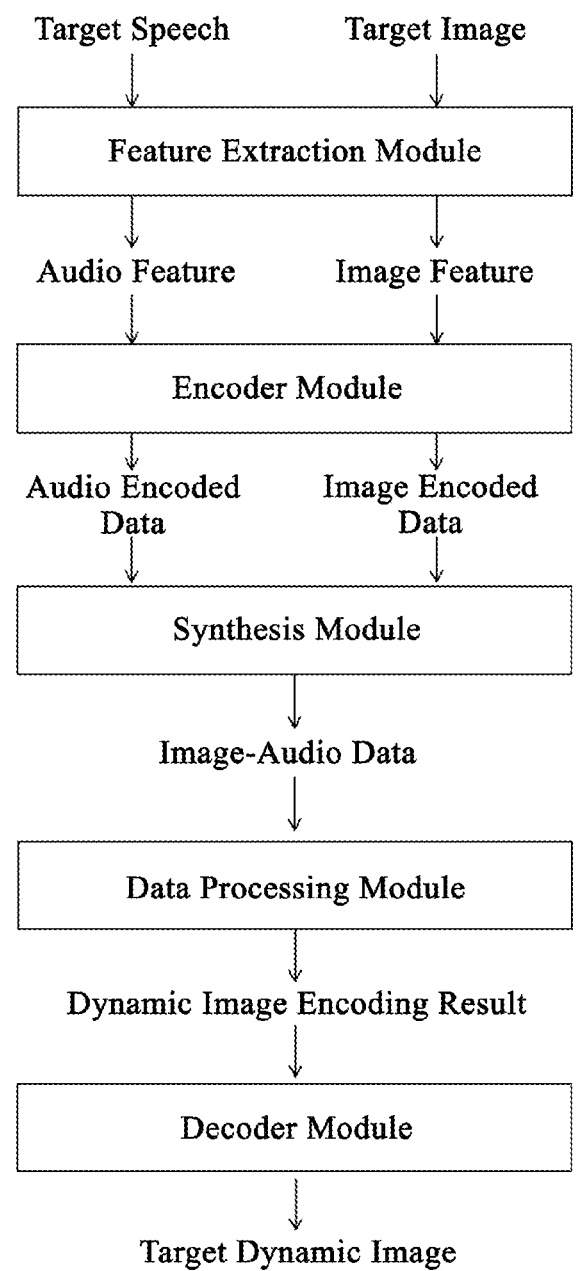
FIG. 2 is an operation flowchart of a model for audio-driven character lip sync according to the present disclosure.

FIG. 2 is an operation flowchart of a model for audio-driven character lip sync according to the present disclosure. In FIG. 2, the feature extraction module is configured to extract an audio feature of target speech and an image feature of a target image. The audio feature of the target speech includes a time-domain feature, a frequency-domain feature, an energy feature, a volume level, and the like. The image feature of the target image may include a color feature, a texture feature, a shape feature, a spatial relationship feature, and the like.

The target speech indicates speech for a target dynamic image generated for a target character. The target speech may be speech recorded for a user through a recording function of a mobile terminal, or may be speech obtained by performing sound processing on speech of a certain user, such as speeding up, speeding down, tone rising, tone falling, or other processing.

The target image indicates a lip sync image for the target dynamic image generated for the target character, that is, the lip sync image of the target character in the generated target dynamic image. The target image may be a character image captured by the user, a virtual digital character image, an animated character image, or the like.

The target dynamic image indicates a video image when the target image performs lip sync actions corresponding to the target speech, the target dynamic image using the target character in the target image as a character image, wherein a mouth area of the character image performs the lip sync actions corresponding to the target speech.

In some embodiments, it may be configured that a virtual background replaces a real background in the target image according to user's needs for the target dynamic image, or dynamic effects, emoticons with decorative effects, pop-up captions, and the like may also be added to the target dynamic image according to user's needs.

The encoder module is configured to encode the audio feature and the image feature to obtain audio encoded data and image encoded data, respectively.

For the image feature, conventional convolutional encoding, such as a convolutional neural network, may be used. In some embodiments, other neural networks or encoders that may encode an image may also be used, such as a deep neural network, and an end-to-end neural network encoder.

For the audio feature, in order to ensure smoothness of sound quality of a generated image, a time series of the audio feature needs to be maintained strictly during the encoding process.

In some embodiments, the encoder module includes an input layer, a convolution layer, and an output layer.

The input layer is configured to input the audio feature as an input sequence. The audio feature may be divided into a plurality of segments for input, but it needs to be ensured that the time series of the audio feature is continuous, thereby ensuring that the lip sync actions corresponding to audio feature are fluent.

The convolution layer is configured to perform convolutional processing on the input sequence. There may be a plurality of convolution layers. To ensure the time series of the audio feature, during the convolution processing on the time series, for convolution layers having an upper-and-lower layer relationship, a value of an upper convolution layer at a certain time depends on only a value of lower convolution layer at the certain time and a value of the lower convolution layer before the certain time. In this way, a strict time constraint relationship is formed, thereby ensuring that the time series of the input sequence is continuous. Further, in a process of determining a value of upper convolution layer at a corresponding time based on a value of the lower convolution layer at the certain time and a value of the lower convolution layer before the certain time, a number of convolution channels in the upper convolution layer that actually participate in convolution calculation is smaller than a number of convolution channels in the lower convolution layer that actually participate in the convolution calculation. For example, when the value of the upper convolution layer is determined based on corresponding outputs of the lower convolution layer at a time t, a time t-1, and a time t-2, corresponding values of the lower convolution layer at the time t, the time t-1, and the time t-2 are output through respective ones of the convolution channels, and the three values are input to one convolution channel in the upper convolution layer for calculation and further output.

The others may be deduced by analogy. In the convolution layer of this embodiment, during an input-to-output process, empty convolution channels may gradually appear in the upper convolution layer during a calculation process. In this case, overall volume of the model may be effectively controlled while calculation is performed.

According to this embodiment, audio errors caused during the encoding may be reduced, thereby further improving accuracy and fluency of audio in the target dynamic image.

The output layer is configured to output the sequence after the convolutional processing as an output sequence. A length of the output sequence is equal to that of the input sequence, and the output sequence and the input sequence are in a unidirectional mapping relationship.

The synthesis module is configured to stitch the audio encoded data and the image encoded data to obtain image-audio data. The image-audio data contains both the audio feature and the corresponding image feature. In the image-audio data, the audio encoded data may be matched with the image encoded data in one-to-one correspondence in unit of frame, so that each image feature corresponds to an audio feature in this image frame, thereby facilitating subsequent further processing on the image-audio data.

The data processing module is configured to perform synthesis processing on the image-audio data to obtain a dynamic image encoding result.

In some embodiments, the data processing module includes several residual blocks and a distraction block.

The residual block is configured to perform deep learning on a feature of the image-audio data. The residual block may extract a deeper feature from the image-audio data, thereby further optimizing a synthesis effect of the dynamic image encoding result.

The distraction block is configured to segment a deep-learning feature of the residual block. The deep-learning feature of the residual block is divided into a plurality of features, and a dynamic encoding result is synthesized based on the plurality of features.

The decoder module is configured to decode the dynamic image encoding result to obtain the target dynamic image.

In some embodiments, the model for audio-driven character lip sync further includes a preprocessing module. The preprocessing module is configured to generate, during a training process of the model for audio-driven character lip sync, a silent video with preset duration based on a sample image, process the silent video as sample image data, and process an auxiliary video as auxiliary data. The sample image indicates a lip sync image of the target character. The auxiliary video includes a non-target lip sync action generated through speaking by a non-target character and non-target speech corresponding to the non-target lip sync action. The sample image data and the auxiliary data are used to train the model.

In this embodiment, each frame of image of the silent video is a sample image, and audio corresponding to each frame of image is blank audio. The auxiliary data is used to be input into a to-be-trained model together with the sample image data, to train the to-be-trained model. An image in the sample image data is the sample image, and audio in the sample image data is the blank audio. An image in the auxiliary data is an image when the non-target character performs the non-target lip sync action, and audio in the auxiliary data is audio of the non-target speech corresponding to the non-target lip sync action. A function of the auxiliary data is to reduce a number of required sample data by mixing the auxiliary data with the sample image to replace a part of the sample image data with the auxiliary data.

Figure 3:
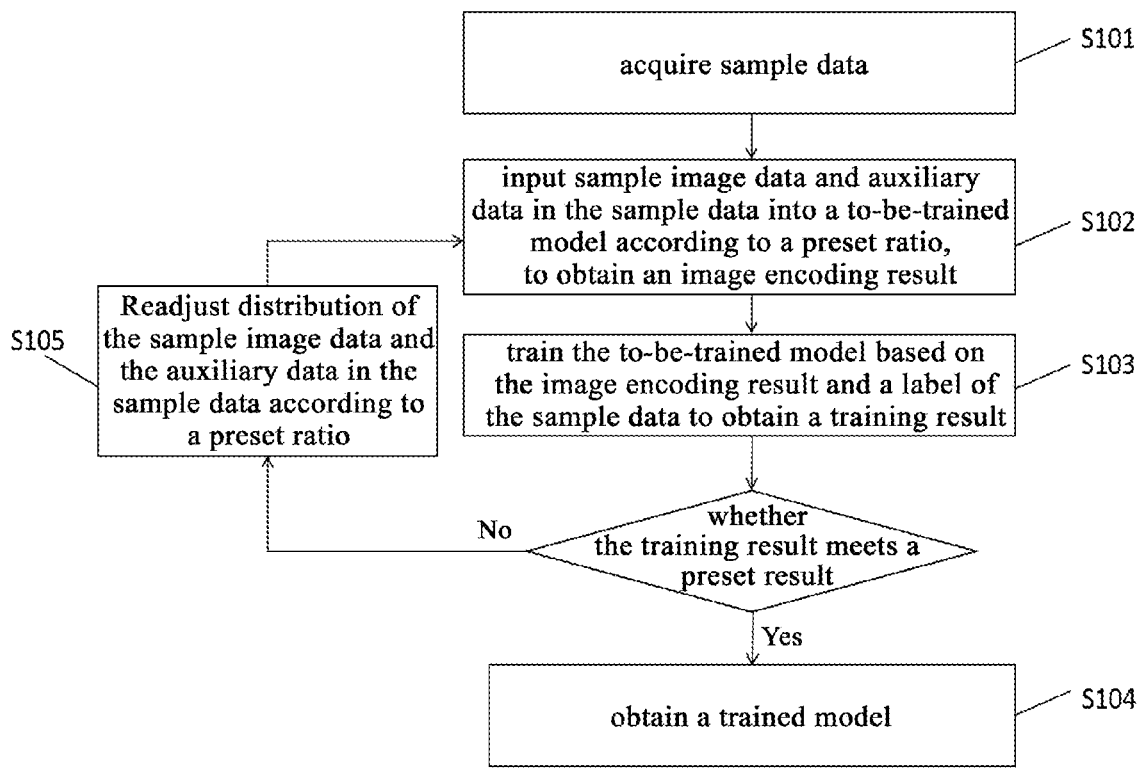
FIG. 3 is a flowchart of a training method for a model for audio-driven character lip sync according to the present disclosure.

According to a second aspect, FIG. 3 is a flowchart of a training method for a model for audio-driven character lip sync according to the present disclosure. The method includes the followings steps.

S101. Acquire sample data, where the sample data includes a sample image and auxiliary data, the sample image indicates a lip sync image for a target character, the auxiliary data is obtained by pre-processing an auxiliary video, and the auxiliary video includes a non-target lip sync action generated through speaking by a non-target character and non-target speech corresponding to the non-target lip sync action.

In step S101, the sample data is processed first, that is, the sample image and the auxiliary data are pre-processed, respectively, to acquire data that may train a to-be-trained model.

It should be noted that the sample image may be a character image captured by a user by a mobile terminal with a camera function, a virtual digital character image, an animated character image, or the like. To enable the model to better train an action of a mouth area, it is best for the sample image to entirely expose face of a character or entirely expose the mouth area of the character.

Further, before processing the sample image, a number of characters in the sample image may be recognized. When there is only one character in the sample image, the sample image may be pre-processed directly. When there are a plurality of characters in the sample image, an image that entirely exposes face of the character is preferentially selected as the sample image. If there are a plurality of images that entirely expose the face of the character, the image with a largest facial area of the character is preferentially selected as the sample image.

A silent video with preset duration is generated based on the sample image, and the silent video is processed as sample image data. Audio in the silent video is blank audio. For example, a silent video of ten minutes is generated based on the sample image. The silent video of ten minutes is pre-processed in unit of frame. Each frame of image serves as the sample image, and the audio of each frame serves as the blank audio.

It should be noted that because a video is composed of frames of image, longer duration of the video indicates that more frame data may be obtained. Therefore, an amount of sample image data required for training the model may be adjusted based on the duration of the generated silent video. When an amount magnitude of required sample image data is relatively large, more sample image data may be acquired by generating a silent video with longer duration. A manner of acquiring the auxiliary data is the same as a principle of the sample image data, which is to select auxiliary videos with different duration and pre-process the auxiliary videos. Details are not described in this embodiment.

S102. Input the sample image data and the auxiliary data in the sample data into a to-be-trained model according to a preset ratio, to obtain an image encoding result.

It should be noted that, in order to reduce an amount magnitude of the sample data, the auxiliary data needs to be used to replace a part of the sample image data to participate in the training. Therefore, the auxiliary data in the sample data cannot be 0.

For example, in one training process of the model, n pieces of sample data are selected for training. The sample image data and the auxiliary data in the n pieces of sample data may be randomly selected. For example, one piece of sample image data and n-1 pieces of auxiliary data are selected, or 20 pieces of sample image data and n-20 pieces of auxiliary data are selected. In this way, it may be ensured that the sample image is trained in each round, thereby achieving a good fitting effect. In some embodiments, a ratio of the image data to the auxiliary data may be 0:1, that is, all sample data participating in the training are auxiliary data.

S103. Train the to-be-trained model based on the image encoding result and a label of the sample data, to obtain a training result, where the to-be-trained model is the model for audio-driven character lip sync according to any item in the first aspect, and the label of the sample data includes the blank audio corresponding to the sample image data in the silent video, and the non-target speech corresponding to the non-target lip sync action in the auxiliary video.

In this embodiment, the image encoding result includes the auxiliary data and the sample image data that are input according to the preset ratio. During the training process, the label of the sample data constantly replaces the audio feature in the image encoding result. In the image encoding result, after the auxiliary data is input into the to-be-trained model, an auxiliary audio feature of the auxiliary data is extracted from the non-target speech. During the training process, the label of the sample data may replace a mute feature in the sample image data and the auxiliary audio feature in the auxiliary data in the image encoding result, to ensure that all data in the image encoding result may be used for training, thereby improving a fitting effect of the image.

Step S103 is described in detail by the same example as described above. In one training process, audio features in the sample data are replaced with m silent features. For example, when n is 500 and m is 100, all sample data may participate in training after training is performed for five times. In actual use, a too large m may easily result in overfitting, which affects a lip sync effect of the target dynamic image, while a too small m may easily result in defects in reconstruction of the target dynamic image. In this example, when m is n/8, the image has a best fitting effect.

S104. Obtain a trained model when the training result meets a preset result, where the preset result indicates that a loss function of the to-be-trained model is trained to converge.

When the training result meets the preset result, it indicates that the loss function of the model has converged, and training of the model has been completed. The user may input target speech to obtain the target dynamic image that drives lip sync action of the target speech. The lip sync action in the target dynamic image is an action taken when content of the target speech is spoken.

In some embodiments, the step of obtaining the trained model when the training result meets the preset result includes:
  calculating a training error of the training result. After the training result is obtained, image accuracy of the training result needs to be determined. In this case, it is needed that the training error is compared with an image error of a standard dynamic image to obtain a comparison result. The image error is an error between two consecutive frames in the standard dynamic image. The training result is a dynamic image obtained by processing the sample data by the to-be-trained model.

In this embodiment, any two consecutive frames of image in the training result may be obtained to serve as calculation material for the image error. When calculating the training error, the training error may be obtained by calculating a mean square error, a root-mean-square error, an average absolute error, or a peak signal to noise ratio of the two frames.

When the comparison result is that the training error is less than or equal to the image error, it indicates that a fitting degree of the training result may meet accuracy of a standard image, and the training result meets the preset result. In addition, it also indicates that the loss function of the model has converged and the training of the model has been completed.

In some embodiments, when the training result does not meet the preset result, proceed to step S105.

S105. Readjust distribution of the sample image data and the auxiliary data in the sample data based on a ratio of the sample image data to the auxiliary data, and input the adjusted sample data into the to-be-trained model again for training.

When the training result does not meet the preset result, it indicates that the fitting effect in the training process of the model is relatively poor, and the fitting degree of the obtained training result cannot meet the accuracy of the standard image. In this case, the distribution of the sample image data and the auxiliary data in the sample data needs to be adjusted, and step S102 needs to be performed again.

Further, the step of readjusting the distribution of the sample image data and the auxiliary data in the sample data according to the ratio of the sample image data to the auxiliary data includes:
  resetting a first preset amount of sample image data and a second preset amount of auxiliary data in the sample data.

During the training process, it needs to be ensured that the sample image data and the auxiliary data remain unchanged. Therefore, a same amount of sample image data or a same amount of auxiliary data needs to be replaced. During the replacement process, the amount of the replaced sample image data and the amount of the replaced auxiliary data may be different. The sample image data and the auxiliary data may be entirely or partially replaced, it needs to only ensure that the sample image data and the auxiliary data before and after the replacement remain unchanged.

In some embodiments, both a third preset amount of sample image data and a fourth preset amount of auxiliary data may be increased or reduced according to the ratio of the sample image data to the auxiliary data. For example, in this case, the ratio of the sample image data to the auxiliary data is 1:3, where the amount of the sample image data is 200, and the amount of the auxiliary data is 600. In this case, the amount of the sample image data may be increased to 400 and the amount of the auxiliary data may be increased to 1200, to ensure that the ratio of the sample image data to the auxiliary data is still 1:3.

Figure 4:
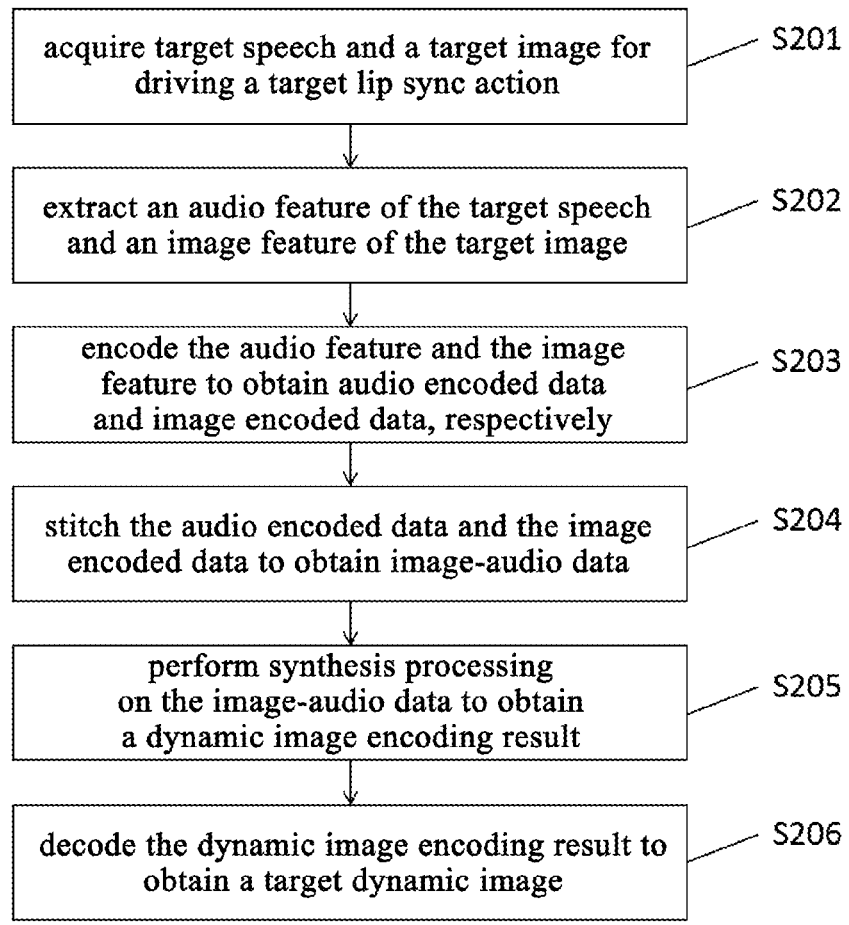
FIG. 4 is a flowchart of a structure of a method for audio-driven character lip sync according to the present disclosure.

According to a third aspect, FIG. 4 is a flowchart of a structure of a method for audio-driven character lip sync according to the present disclosure. The method is applicable to a model for audio-driven character lip sync that is obtained by any training method according to the second aspect, and includes:
  S201. Acquire target speech and a target image for driving a target lip sync action, where the target speech indicates speech for a target dynamic image generated for a target character, the target image indicates a lip sync image for the target dynamic image generated for the target character, and the target dynamic image indicates a video image when the target image performs lip sync actions corresponding to the target speech;
  S202. Extract an audio feature of the target speech and an image feature of the target image;
  S203. Encode the audio feature and the image feature to obtain audio encoded data and image encoded data, respectively;
  S204. Stitch the audio encoded data and the image encoded data to obtain image-audio data;
  S205. Perform synthesis processing on the image-audio data to obtain a dynamic image encoding result; and
  S206. Decode the dynamic image encoding result to obtain the target dynamic image.

According to the method described above, the target image used to synthesize the target dynamic image and the target speech for the target dynamic image generated for the target character need to be input into the trained model for audio-driven character lip sync. Steps S201 to S206 are performed by the trained model for audio-driven character lip sync, to output the target dynamic image.

Further, the process of encoding the audio feature to obtain the audio encoded data includes:

performing causal convolution calculation on the audio feature to obtain causal convolution data. During the causal convolution, an output of each layer is obtained from an input of a previous layer. After calculation by a plurality of convolution layers, the audio feature may be encoded.

A number of the convolution layers needs to be increased if a number of inputs to one output corresponds is more and a distance between the input and the output is greater. However, an increase in the number of the convolution layers may result in problems such as a vanishing gradient, complex training, and a poor fitting effect. To resolve the foregoing problems, dilated convolution calculation also needs to be performed on the causal convolution data, to obtain dilated convolution data. Dilated convolution may make the model have a wider perception field when there are relatively less layers by skipping some inputs, thereby resolving the problem of a vanishing gradient.

In this case, a residual error generated during the convolution calculation needs to be calculated, and synthesis needs to be performed on the residual error and the diluted convolution data obtained after the diluted convolution calculation, to obtain the audio encoded data.

Application of the foregoing method is described below in detail with reference to embodiments.

In this exemplary embodiment, description is made by an example in which a user expects to generate a dynamic avatar for a certain APP. First, a photograph showing face of a person that is taken by the user through a mobile terminal program is obtained, and is uploaded to cloud. Based on the photograph, the cloud may complete training of a model for audio-driven lip sync with reference to the foregoing model for audio-driven character lip sync and the corresponding training method of the model. After the training is completed, the user records a segment of audio, such as "Hello", through the mobile terminal program to serve as target audio, and uploads the target audio to the cloud. The cloud inputs the photograph and the target audio into the pre-trained model for audio-driven lip sync, and outputs the final target dynamic image.

It should be noted that in the foregoing embodiment, the target dynamic image is generated by the user for the first time. Therefore, the model for audio-driven lip sync needs to be trained. After being trained, when the model for audio-driven lip sync is used by the user again, the photograph with the face of the person and the recorded target audio may be input directly.

It may be learned from the foregoing solutions that the present disclosure provides a method for audio-driven character lip sync, a model for audio-driven character lip sync, and a training method therefor. The feature extraction module of the model can perform feature extraction on the target image and the target speech that are input by the user, respectively. The audio feature and the image feature are encoded by the encoder. Further, the audio encoded data and the image encoded data are stitched to obtain the image-audio data. Finally, the image-audio data is synthesized and decoded to obtain the target dynamic image. The model for audio-driven character lip sync may further process the sample image and the auxiliary video during the training process, to obtain the sample image data and the auxiliary data that are used for training. The model may directly process based on the target image and the target speech that are input by the user, to obtain the target dynamic image about that the target image takes the lip sync action corresponding to the content of the target speech.

According to the training method, the sample data is obtained first, including the sample image and the auxiliary data. The auxiliary video for model training is obtained, and the auxiliary video is pre-processed to obtain the auxiliary data. A segment of silent video with the preset duration is generated for the sample image, and the silent video is pre-processed to obtain the sample image data. During the process of training the to-be-trained model, the sample image data and the auxiliary data are input into the to-be-trained model in the preset ratio. The auxiliary data containing the non-target lip sync action that is made when the non-target character speaks may improve a process of training a synthetic lip sync action of the model, so that there are no parts unrelated to the synthetic lip sync action during the training process. In this way, a problem that a large amount of sample data is required during the training process is resolved.

According to the method for audio-driven character lip sync, the user inputs a photograph and a segment of speech into the model for audio-driven character lip sync. The image feature of the photograph and the audio feature of the speech are, respectively extracted. Moreover, the image feature and the audio feature are encoded, respectively, to obtain the audio encoded data and the image encoded data. The audio encoded data and the image encoded data are stitched to obtain the image-audio data. Finally, a synthesis processing and decoding processing on the image-audio data are further performed to obtain the target dynamic image.

For similar parts between the embodiments provided in the present disclosure, reference may be made to each other. The specific implementations described above are merely some examples under a general concept of the present disclosure, and do not constitute any limitation to the protection scope of the present disclosure. For a person skilled in the art, any other implementations derived according to the solutions of the present disclosure without an effective effort all fall within the protection scope of the present disclosure.

Merely preferred implementations of the present disclosure are described above. It should be noted that for persons of ordinary skills in the art, improvements and modifications may be made without departing from the principles of the present disclosure, and these improvements and modifications should also be considered as being subject to the protection scope of the present disclosure.

What is claimed is:

1. A system model on cloud for audio-driven character lip sync, wherein the model on cloud is configured to:
    extract an audio feature of target speech and an image feature of a target image, wherein the target speech indicates speech for a target dynamic image generated for a target character, the target image indicates a lip sync image for the target dynamic image generated for the target character, and the target dynamic image indicates a video image when the target image performs lip sync actions corresponding to the target speech;
    encode the audio feature and the image feature to obtain audio encoded data and image encoded data, respectively;
    stitch the audio encoded data and the image encoded data to obtain image-audio data;

perform synthesis processing on the image-audio data to obtain a dynamic image encoding result;

decode the dynamic image encoding result to obtain the target dynamic image; and generate, during a training process of the model, a silent video with preset duration based on a sample image, process the silent video as sample image data, and process an auxiliary video as auxiliary data, wherein the sample image indicates a lip sync image of the target character; the auxiliary video comprises a non-target lip sync action generated through speaking by a non-target character and non-target speech corresponding to the non-target lip sync action; and the sample image data and the auxiliary data are used for training of the model.

2. The system model on cloud for audio-driven character lip sync, according to claim 1, wherein the system model on cloud further comprises:

an input layer configured to input the audio feature as an input sequence;

a convolution layer configured to perform convolutional processing on the input sequence; and an output layer configured to output the sequence after the convolutional processing as an output sequence.

3. The system model on cloud for audio-driven character lip sync, according to claim 2, wherein for performing synthesis processing on the image-audio data to obtain a dynamic image encoding result, the cloud is further configured to:

perform deep learning on a feature of the image-audio data; and segment a deep-learning feature of the residual block.

4. A training method for a model for audio-driven character lip sync, comprising:

acquiring sample data comprising a sample image and auxiliary data, wherein the sample image indicates a lip sync image for a target character, the auxiliary data is obtained by pre-processing an auxiliary video, and the auxiliary video comprises a non-target lip sync action generated through speaking by a non-target character and non-target speech corresponding to the non-target lip sync action;

generating a silent video with a preset duration based on the sample image, and processing the silent video as sample image data, wherein audio in the silent video is blank audio;

inputting the sample image data and the auxiliary data in the sample data into a to-be-trained model according to a preset ratio, to obtain an image encoding result, and training the to-be-trained model based on the image encoding result and a label of the sample data, to obtain a training result, wherein the to-be-trained model is a model on cloud for audio-driven character lip sync, and the label of the sample data comprises the blank audio corresponding to the sample image data in the silent video, and the non-target speech corresponding to the non-target lip sync action in the auxiliary video; and obtaining a trained model when the training result meets a preset result, wherein the preset result indicates that a loss function of the to-be-trained model is trained to converge, wherein after the input of the sample data into the model on cloud for audio-driven character lip sync, the sample data is preprocessed to obtain the sample image data and the auxiliary data;

an audio feature of target speech and an image feature of a target image are extracted from the sample data, wherein the target speech indicates speech for a target dynamic image generated for a target character, the target image indicates a lip sync image for the target dynamic image generated for the target character, and the target dynamic image indicates a video image when the target image performs lip sync actions corresponding to the target speech;

the audio feature and the image feature are encoded to obtain audio encoded data and image encoded data, respectively;

the audio encoded data and the image encoded data are stitched to obtain image-audio data;

synthesis processing is performed on the image-audio data to obtain a dynamic image encoding result;

the dynamic image encoding result is decoded to obtain the target dynamic image.

5. The training method for a model for audio-driven character lip sync according to claim 4, when the training result does not meet the preset result, readjusting distribution of the sample image data and the auxiliary data in the sample data according to the preset ratio, and inputting the adjusted sample data into the to-be-trained model again for training; and obtaining the trained model when the training result meets the preset result.

6. The training method for a model for audio-driven character lip sync according to claim 5, wherein the readjusting distribution of the sample image data and the auxiliary data in the sample data according to the preset ratio comprises:

resetting a first preset amount of sample image data and a second preset amount of auxiliary data in the sample data, or increasing or reducing both a third preset amount of sample image data and a fourth preset amount of auxiliary data based on the preset ratio.

7. The training method for a model for audio-driven character lip sync according to claim 6, wherein the obtaining the trained model when the training result meets the preset result comprises:

calculating a training error of the training result; and comparing the training error with an image error of a standard dynamic image to obtain a comparison result, the image error being an error between two consecutive frames in the standard dynamic image, wherein when the comparison result is that the training error is less than or equal to the image error, the training result meets the preset result.

8. A method for audio-driven character lip sync, applicable to a model for audio-driven character lip sync that is obtained by a training method for a model for audio-driven character lip sync, and comprising:

acquiring target speech and a target image for driving a target lip sync action, wherein the target speech indicates speech for a target dynamic image generated for a target character, the target image indicates a lip sync image for the target dynamic image generated for the target character, and the target dynamic image indicates a video image when the target image performs lip sync actions corresponding to the target speech;

extracting an audio feature of the target speech and an image feature of the target image;

encoding the audio feature and the image feature to obtain audio encoded data and image encoded data, respectively;

stitching the audio encoded data and the image encoded data to obtain image-audio data;

performing synthesis processing on the image-audio data to obtain a dynamic image encoding result; and decoding the dynamic image encoding result to obtain the target dynamic image, wherein the training method for a model for audio-driven character lip sync comprises:

acquiring sample data comprising a sample image and auxiliary data, wherein the sample image indicates a lip sync image for a target character, the auxiliary data is obtained by pre-processing an auxiliary video, and the auxiliary video comprises a non-target lip sync action generated through speaking by a non-target character and non-target speech corresponding to the non-target lip sync action;

generating a silent video with a preset duration based on the sample image, and processing the silent video as sample image data, wherein audio in the silent video is blank audio;

inputting the sample image data and the auxiliary data in the sample data into a to-be-trained model according to a preset ratio, to obtain an image encoding result, and training the to-be-trained model based on the image encoding result and a label of the sample data, to obtain a training result, wherein the to-be-trained model is a model on cloud for audio-driven character lip sync, and the label of the sample data comprises the blank audio corresponding to the sample image data in the silent video, and the non-target speech corresponding to the non-target lip sync action in the auxiliary video; and obtaining a trained model when the training result meets a preset result, wherein the preset result indicates that a loss function of the to-be-trained model is trained to converge, wherein after the input of the sample data into the model on cloud for audio-driven character lip sync, the sample data is preprocessed to obtain the sample image data and the auxiliary data;

an audio feature of target speech and an image feature of a target image are extracted from the sample data, wherein the target speech indicates speech for a target dynamic image generated for a target character, the target image indicates a lip sync image for the target dynamic image generated for the target character, and the target dynamic image indicates a video image when the target image performs lip sync actions corresponding to the target speech;

the audio feature and the image feature are encoded to obtain audio encoded data and image encoded data, respectively;

the audio encoded data and the image encoded data are stitched to obtain image-audio data;

synthesis processing is performed on the image-audio data to obtain a dynamic image encoding result;

the dynamic image encoding result is decoded to obtain the target dynamic image.

9. The method for audio-driven character lip sync according to claim 8, wherein the encoding the audio feature to obtain the audio encoded data comprises:

performing causal convolution calculation on the audio feature to obtain causal convolution data;

performing dilated convolution calculation on the causal convolution data to obtain dilated convolution data;

calculating a residual error generated during the convolution calculation; and obtaining the audio coded data based on the dilated convolution data and the residual error.

* * * * *